United States Patent
Huang

(10) Patent No.: US 9,906,956 B1
(45) Date of Patent: Feb. 27, 2018

(54) USING POWER-LINE NETWORKS TO FACILITATE NETWORK ACCESS

(71) Applicant: Google Inc., Mountain View, CA (US)

(72) Inventor: Jonathan Huang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/380,590

(22) Filed: Dec. 15, 2016

(51) Int. Cl.
| | |
|---|---|
| *H04W 12/06* | (2009.01) |
| *G06F 1/26* | (2006.01) |
| *H04W 12/08* | (2009.01) |
| *H04W 12/04* | (2009.01) |
| *H04L 29/06* | (2006.01) |
| *H04L 12/24* | (2006.01) |

(52) U.S. Cl.
CPC .............. *H04W 12/06* (2013.01); *G06F 1/26* (2013.01); *H04L 41/0809* (2013.01); *H04L 41/0886* (2013.01); *H04L 63/0846* (2013.01); *H04L 63/102* (2013.01); *H04W 12/04* (2013.01); *H04W 12/08* (2013.01)

(58) Field of Classification Search
CPC ....... H04W 12/04; H04W 12/06; G06F 21/30; G06F 21/44; H04L 9/0802; H04L 63/06; H04L 63/052
See application file for complete search history.

(56) References Cited

U.S. PATENT DOCUMENTS

| | | | |
|---|---|---|---|
| 7,546,373 B2 | 6/2009 | Lehew et al. | |
| 7,574,202 B1 * | 8/2009 | Tsao | H04L 63/0272 |
| | | | 370/310 |
| 8,925,042 B2 | 12/2014 | Drovdahl et al. | |
| 2003/0219129 A1 * | 11/2003 | Whelan | H04L 9/0891 |
| | | | 380/270 |

(Continued)

FOREIGN PATENT DOCUMENTS

| | | |
|---|---|---|
| EP | 2817992 B1 | 8/2016 |
| WO | WO2016003311 | 1/2016 |

OTHER PUBLICATIONS

'Cisco.com' [online]. "Cisco Connected Grid Security for Field Area Network," 2012, [retrieved on Dec. 15, 2016]. Retrieved from the Internet: URL<http://www.cisco.com/c/dam/en/us/products/collateral/routers/500-series-wpan-industrial-routers/cgs_fan_white_paper.pdf>. 6 pages.

(Continued)

*Primary Examiner* — David J Pearson
(74) *Attorney, Agent, or Firm* — Fish & Richardson P.C.

(57) ABSTRACT

Methods, systems, and apparatuses, including computer programs encoded on a computer-readable storage medium for implementing network connectivity using power lines are described. After a device is connected to a power line, wireless network credentials that enable the device to access to a wireless network are transmitted to the device through the power line. A request is received from the device to connect to the wireless network. The request includes the wireless network credentials transmitted to the device through the power line. The device is determined to be authorized to access the wireless network based on the one or more credentials received in the request. In response to determining that the one or more wireless network credentials received in the request from the device are valid, wireless network access is provided to the device.

24 Claims, 5 Drawing Sheets

(56) References Cited

U.S. PATENT DOCUMENTS

| | | | |
|---|---|---|---|
| 2005/0234568 A1* | 10/2005 | Chung | H04L 12/2827 700/90 |
| 2006/0018328 A1 | 1/2006 | Mody et al. | |
| 2006/0026670 A1 | 2/2006 | Potter et al. | |
| 2007/0079123 A1* | 4/2007 | Iwamura | H04L 63/061 713/171 |
| 2007/0147318 A1 | 6/2007 | Ross et al. | |
| 2007/0222578 A1 | 9/2007 | Iwamura | |
| 2007/0271383 A1* | 11/2007 | Kim | H04L 63/08 709/227 |
| 2011/0296501 A1* | 12/2011 | Drovdahl | H04L 63/18 726/4 |
| 2011/0317603 A1* | 12/2011 | Ruiz Lopez | G07F 15/08 370/311 |
| 2012/0275443 A1 | 11/2012 | Shpak | |
| 2013/0054962 A1 | 2/2013 | Chawla et al. | |
| 2013/0152152 A1* | 6/2013 | Benyola | H04N 21/25891 725/153 |
| 2013/0205378 A1 | 8/2013 | Oba et al. | |
| 2014/0068028 A1 | 3/2014 | Sakai et al. | |
| 2015/0382187 A1* | 12/2015 | Kruglick | H04L 63/18 380/44 |
| 2016/0112374 A1* | 4/2016 | Branca | H04L 63/102 726/1 |

OTHER PUBLICATIONS

'cnet.com' [online]. "How to extend your wi-fi network with a power line adapter," Aug. 2015, [retrieved on Dec. 15, 2016]. Retrieved from the Internet:URL<http://www.cisco.com/c/dam/en/us/products/collateral/routers/500-series-wpan-industrial-routers/cgs_fan_white_paper.pdf>.

'techreport.com' [online]. "Mixing power-line networking with Wi-Fi proves intoxicating," Sep. 2015, [retrieved on Dec. 15, 2016]. Retrieved from the Internet: URL<http://www.cisco.com/c/dam/en/us/products/collateral/routers/500-series-wpan-industrial-routers/cgs_fan_white_paper.pdf> 3 pages.

'Wikipedia.com' [online]. "Power-line communication," Nov. 2016, [retrieved on Dec. 15, 2016]. Retrieved from the Internet: URL<https://en.wikipedia.org/w/index.php?title=Power-line_communication&action=history> 9 pages.

'eeweb.com' [online]. "Configuring IoT Devices: ProbMe Makes it Easy," Nov. 2014, [retrieved on Dec. 15, 2016]. Retrieved from the Internet: URL<https://www.eeweb.com/blog/eeweb/configuring-iot-devices-probme-makes-it-easy> 3 pages.

'ti.com' [online]. "A primer to Wi-Fi provisioning for IOT applications," 2014, [retrieved on Dec. 15, 2016]. Retrieved from the Internet: URL< http://www.ti.com/lit/wp/swry011/swry011.pdf> 9 pages.

* cited by examiner

USING POWER-LINE NETWORKS TO FACILITATE NETWORK ACCESS

FIELD

This disclosure generally relates to network connectivity of devices.

BACKGROUND

Internet of Things (IoT) relies on the connection of devices to a network to share data and provide services to users. Each of the devices can execute various applications and methods for sharing or manipulating data collected by network devices. However, the connection of these devices to a network can often require substantial effort by a user. Similarly, establishing a network connection may be challenging if a device has a limited user interface.

SUMMARY

According to some implementations, when a device connects to a power line, the device may receive information through the power line to access a wireless network in the vicinity of the building. The wireless network access information may include, for example, credentials such as a password, a key, or a certificate. After receiving the wireless network access information, the device may determine whether to join the wireless network based on particular criteria. After determining that it would like to join the wireless network, the device transmits a request for joining the wireless network. This request may be transmitted wirelessly or through the power line to a network router, and includes the wireless network access information received through the power line. A network router may verify whether the wireless network access information is valid, and upon verification, may allow the device to access the wireless network through a secure wireless connection.

As discussed further below, the techniques in this application can allow new devices to be authenticated to a secured network with minimal or no effort by a user. For example, when a user brings home a new device and plugs it in for the first time, the device may identify and connect to the user's home wireless network automatically, simply by being connected to a power line. Because information for joining the wireless network is obtained over the power line, the user does not need to setup the device for the network or specify any network ID or password for the wireless network, even for the very first connection to the wireless network. This allows devices requiring network connections to operate in a "plug-and-play" manner simply by being connected to a power line. In some implementations, devices may also receive other information over the power line to automatically set up other aspects of their operation. For example, a processing device, such as a network router, can use power line networking to indicate the location of the device in a house or information about other devices in a house to the owner of the device. This information allows a device to automatically customize its operation for a particular context, without needing to be paired or manually connected with other devices. The ability to automatically establish connections among various devices can be particularly helpful when various devices need to coordinate their operation, such as in IoT arrangements.

In addition, the security of a wireless network can be enforced. The long-term storage of network credentials can pose a security risk, since devices are often loaned to others, sold, or compromised by attackers. But since many devices have no way of automatically obtaining access to a wireless network, and require user to set up network access with manual input, it is common to store persistent network credentials so users do not have to manually enter network information each time a device is used. With the techniques of the present application, devices can be configured to store network credentials only in volatile memory, so that powering off the device erases the network credentials and eliminates the risk of the device aiding unauthorized future access. The password or key for the wireless network can have a relatively short duration before it expires, e.g., 2 hours, 6 hours, 1 day, 1 week, etc. Although the credentials needed to access the wireless network change, each device can obtain the new credentials automatically when powered on, through the power line network. This arrangement can allow automatic network access to be provided to devices that are coupled to a particular physical electrical circuit, e.g., the power line network in a user's home. Devices that are currently authenticated on the wireless network and devices connected to the power line may receive up-to-date credentials, while other devices are unable to access the wireless network.

The above-noted aspects and implementations further described in this specification may offer several advantages. For example, one advantage is that a user who has connected a device to a power line does not have to determine how to connect the device to a wireless network. Implementations described in this specification provide a method through which the device can automatically access a wireless network. The user experiences enhanced convenience and also saves time spent adding devices to a wireless network. The added convenience and ease may also facilitate a greater number of IoT devices to be used, thereby providing a user with more IoT options, enhanced data sharing and collection, and a larger number of devices to control or manipulate through various IoT mechanisms.

Additional advantages may be provided to guests visiting a building. For example, a guest present in a user's home does not have to ask for access information for the user's wireless network. Instead, the guest can plug the guest's electronic device into a power outlet and be connected to the user's wireless network without the user having to tell the guest the wireless network access information.

Implementations described herein also offer security advantages. Instead of transmitting sensitive information such as network access information wirelessly, implementations described herein describe a secure method for transmitting sensitive information over power lines making it more difficult for a non-authorized party to be exposed to this sensitive information.

In general, innovative aspects of the subject matter described in this specification can be embodied in a system that includes one or more computing devices and one or more storage devices storing instructions that, when executed by the one or more computing devices, cause the one or more computing devices to perform operations. The operations include determining, by the one or more computing devices, that a device has been connected to a power line. In response to determining that the device has been connected to the power line, the one or more computing devices transmit one or more wireless network credentials to the device through the power line. The wireless network credentials enable the device to access to a wireless network. The one or more computing devices receive a request from the device to connect to the wireless network. The request includes the one or more wireless network credentials transmitted by the one or more computing devices to the device through the power line. The operations further include determining, based on the one or more credentials received in the request from the device, that the device is authorized to access the wireless network, and providing the device access to the wireless network in response to determining that the one or more wireless network credentials received in the request from the device are valid.

In some implementations, the operations include transmitting, to the device over the power line, data indicative of an expiration time period for the one or more credentials, generating a second credential in response to the one or more credentials expiring and the expiration time period having transpired, and transmitting, to the device, the second credential and data indicative of an expiration time period for the second credential.

In some implementations, the operations include determining that the device has been disconnected from the power line, and terminating a wireless connection between the device and the wireless network in response to determining that the device has been disconnected from the power line.

In some implementations, the operations include identifying a location of the device based on a location of the connection between the device and the power line, and determining a location of a router that provides access to the wireless network based on the identified location of the device.

In some implementations, the one or more credentials include a Wi-Fi protected access two (WPA2) session key. The operation of determining, based on the one or more credentials received in the request from the device, that the device is authorized to access the wireless network includes determining that the WPA2 session key received from the device matches a session key at the one or more computing devices.

In some implementations, the operations further include, responsive to providing the device access to the wireless network, registering the device by storing, in a database, device information indicative of one or more of a device type, a device name, and an operating state of the device.

In some implementations, the operations further include determining that the device is disconnected from the power line, and in response to determining that the device is disconnected from the power line: terminating registration of the device by removing the stored device information from the database, and revoking the one or more credentials that enable the device to access to the wireless network.

In some implementations, the operations further include receiving device information indicating characteristics of the device, determining, by one or more computing devices, a profile of the device based on the received characteristics of the device, obtaining protocol data associated with the profile of the device, and transmitting the protocol data to the device. The protocol data includes permissions and configurations for a connection of the device to the wireless network.

In some implementations, the operations further include allocating a first authority level or a second authority level to the device. The first authority level grants the device a permission to execute one or more operations at a second device connected to the power line. The second authority level prevents the device from executing one or more operations at a second device connected to the power line, and grants the second device permission to execute one or more operations at the device.

In some implementations, the allocation of the first authority level or the second authority level to the device is based on one or more of network settings configured by a user and one or more characteristics of the device.

Innovative aspects of the subject matter described in this specification can be embodied in a device that includes one or more processors and one or more storage devices storing instructions which when executed by the one or more processors, cause the one or more processors to perform operations. The operations include establishing, by the device, a power line communication connection over a power line in response to being connected to the power line, and receiving, from one or more computing devices, one or more wireless network credentials for accessing a wireless network. The one or more wireless network credentials are received through the power line. The operations include transmitting, to the one or more computing devices, a request to connect to the wireless network. The request includes the one or more wireless network credentials received from the one or more computing devices through the power line. The operations include receiving, from the one or more computing devices, data indicating that the client device has access to the wireless network.

In some implementations, the operations further include receiving, from the one or more computing devices, data indicative of an expiration time period for the one or more credentials, and storing, by the device in a storage database, the one or more credentials and the data indicative of the expiration time period for the one or more credentials.

In some implementations, the operations further include determining that the device has been disconnected from the power line, receiving, from the one or more computing devices, an indication that the one or more wireless network credentials for accessing the wireless network have been revoked, and removing, from the storage database, the one or more wireless network credentials and the data indicative of the expiration time period for the one or more credentials.

In some implementations, the one or more credentials include a Wi-Fi protected access two (WPA2) session key.

In some implementations, the operations further include transmitting, to the one or more computing devices, device information that includes data indicative of one or more of a device type, a device name, and an operating state of the device, and receiving, from the one or more computing devices, one or more wireless network permissions assigned to the device based on the device information.

In some implementations, the one or more network permissions assigned to the device include a first authority level or a second authority level. The first authority level grants the device a permission to execute one or more operations at a second device connected to the power line. The second authority level prevents the device from executing one or more operations at a second device connected to the power line.

Innovative aspects of the subject matter described in this specification can be embodied in a computer-implemented method. The method includes determining, by one or more computing devices, that a device has been connected to a power line. In response to determining that the device has been connected to the power line, the one or more computing devices transmit one or more wireless network credentials to the device through the power line. The wireless network credentials enable the device to access to a wireless network. The one or more computing devices receive a request from the device to connect to the wireless network. The request includes the one or more wireless network credentials transmitted by the one or more computing devices to the device through the power line. The method further includes determining, based on the one or more credentials received in the request from the device, that the device is authorized to access the wireless network, and providing the device access to the wireless network in response to determining that the one or more wireless network credentials received in the request from the device are valid.

In some implementations, the method further includes determining that the device has been disconnected from the power line, and terminating a wireless connection between the device and the wireless network in response to determining that the device has been disconnected from the power line.

In some implementations, the method further includes receiving device information indicating characteristics of the device, determining, by one or more computing devices, a profile of the device based on the received characteristics of the device, obtaining protocol data associated with the profile of the device, and transmitting the protocol data to the device. The protocol data includes permissions and configurations for a connection of the device to the wireless network.

In some implementations, the method further includes allocating a first or second authority level to the device. The first authority level grants the device a permission to execute one or more operations at a second device connected to the power line. The second authority level to the device prevents the device from executing one or more operations at a second device connected to the power line, and grants the second device permission to execute one or more operations at the device. The allocation of the first authority level or the second authority level to the device is based on one or more of network settings configured by a user and the profile of the device.

The details of one or more aspects described in this specification are set forth in the accompanying drawings and the description below. Other features, aspects, and advantages of the subject matter will become apparent from the description, the drawings, and the claims. Other aspects include corresponding methods, systems, apparatus, computer-readable storage media, and computer programs configured to implement the above-noted embodiments.

BRIEF DESCRIPTION OF THE DRAWINGS

Like reference numbers and designations in the various drawings indicate like elements.

DETAILED DESCRIPTION

Exemplary implementations are described with reference to the figures.

Figure 1:
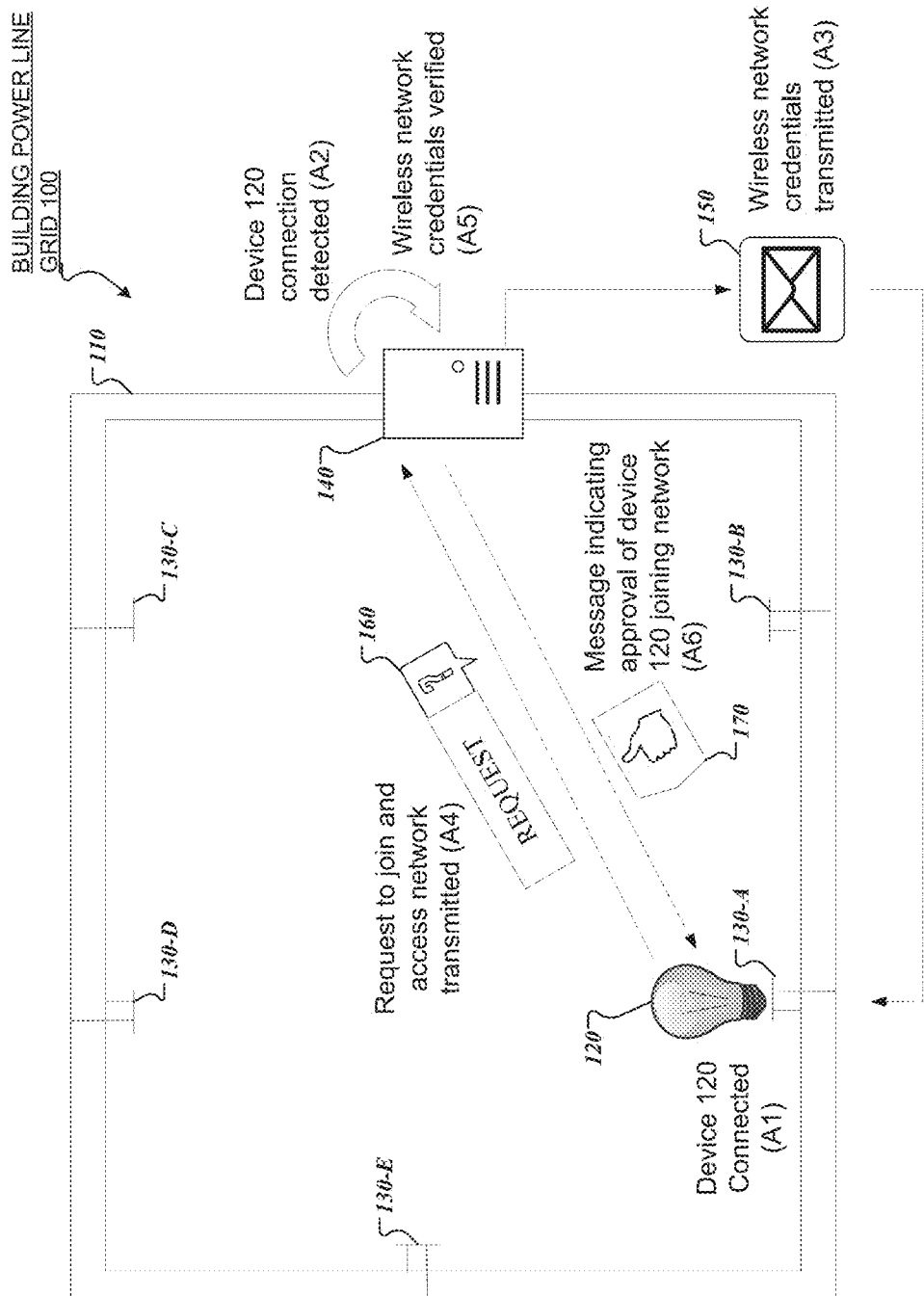
FIG. 1 depicts a building power line grid system in which a device connects to a power line.

FIG. 1 depicts an illustration of a building power line grid 100 which includes a power line network 110, a power line network controller 140, and various power line connectors 130-A, 130-B, 130-C, 130-D, 130-E (hereinafter collectively referred to as "130A-E" and individually as "130A/E"). The building power line grid 100 may be implemented in or attached to various types of buildings such as offices, condominiums, apartments, townhomes, single family homes, lofts, and cabins. In general, the building power line grid 100 may be implemented wherever electrical power is available. The building power line grid 100 may include one or more of a transformer, a circuit, a circuit breaker, a meter, hot wires, neutral wires, ground wires, adapters, and filters.

The power line network 110 may allow communications to be sent and received over the power line grid 100. The power line network 110 can allow communication throughout a building or in certain portions of a building. For instance, one or more portions of the power line network 110 may be implemented within or on the inner walls, outer walls, ceilings, or floors of a building. The power line network 110 may use various electrical cables and lines, such as the hot wires, neutral wires, and ground wires. In general, the power line grid 100 provides current and electrical power to the various power line connectors 130A-E at various suitable voltages, such as 110V, 120V, or 220V. The power line network 110 generally uses the same wiring and components of the power line grid 100 to enable data communications, and may additionally include adaptors, signal repeaters, or other components. The power line network 110 can enable data transfer between the power line network controller 140 and the various power line connectors 130A-E through the power line grid 100. In some cases, the power line network 110 may transfer data through the same wires that supply power. Power may be provided to a device 120 simultaneously with the data communication on the same wires. In some cases, the power line network 110 may transfer data over wires different than power lines. In general, the power line network 110 is an interface configured to provide power and data to a device 120.

Each of the power line connectors 130A-E is an interface between the power line network 110 and a device 120, and generally provides electrical power from the power line network 110 to a device 120. The power line connectors 130A-E may also transport data between the power line network 110 and the device 120.

The power line connectors 130A-E may each be implemented and configured in various manners. In general, a power line connector 130A/E may be any electrical outlet or port that can be connected to a device 120. In some cases, a power line connector 130A/E may be a USB port.

In some implementations, the power line connectors 130A-E may be an electrical plug such as a smart plug and may include various controllers and electronic components. For example, a power line connector 130A/E may include one or more of a sensor, a switch, current controllers, or voltage controllers. In some cases, a power line connector 130A/E may include one or more of a processor, a wireless transceiver, or a storage unit.

In some implementations, the power line connectors 130A-E may be configured to execute various operations. For instance, in some cases, a power line connector 130A/E may be configured to provide electrical power to a device 120 only at particular times or upon the satisfaction of certain conditions. These conditions may include environmental conditions such as lighting, temperature, humidity, or operating conditions. As an example, a power line connector 130A/E, such as a smart outlet, may be configured to provide electrical power to a device 120 only when a particular lighting threshold, such as dim or no light, is satisfied. In another example, a smart outlet may be configured to control the amount of power being provided to a connected device 120 by manipulating an electrical switch in response to a signal received from the power line network controller 140.

The device 120 may be any electronic device that can transmit and receive data over a network and can connect to a power line connector 130A/E. The device 120 includes (i) a power line network interface that enables data communication over a wired connection to a power line, and (2) an additional network interface, such as a wireless network interface, that enables data communication over another communication channel. Examples of a device 120 include, but are not limited to, a smart television (TV), a smart bulb, a smart car, a camera, a smart phone, a laptop or desktop computer, an electronic pad, and a smart refrigerator.

In some implementations, the device 120 may include a processor and/or a data storage unit. The device 120 may store software that, upon execution by the processor, performs one or more operations for operating the device 120. The device 120 may also communicate with power line network controller 140 or a network router wirelessly or through the power line network 110. In some cases, the device 120 may perform one or more operations in response to receiving signals from the power line network controller 140 or a network router.

In general, the power line network controller 140 may communicate with the power line connectors 130A-E and any device 120 connected to a power line connector 130A/E. In some implementations, the power line network controller 140 is a power line network router. This power line network router may be integrated with a wireless network router or access point that provides the wireless network. The power line network controller 140 may detect electronic circuit conditions such as power levels, current levels, voltage levels, and new connections with external devices such as a device 120. In some implementations, the power line network controller 140 may also control the electronic circuit conditions in the power line network 110. The power line network controller 140 is described in further detail with reference to FIG. 5.

In FIG. 1, a device 120 is connected to the power line network 110 through power line connector 130-A (A1). The power line network controller 140 may detect the connection (A2), and transmit wireless network credentials 150 that can be used by the device 120 to access a wireless network (A3). The wireless network credentials 150 are transmitted over the power line network 110 through the power line connector 130-A. After receiving the credentials 150, the device 120 may determine whether to connect to the wireless network based on one or more criteria. If the device 120 determines that the one or more criteria are satisfied, the device 120 may transmit a request 160 to join and access the wireless network (A4). The request 160 may include the wireless network credentials 150 received through the power line network 110 and information describing the device 120. The power line network controller 140 may verify the validity of the wireless network credentials 150 (A5). If the wireless network credentials 150 are valid, the power line network controller 140 may transmit a message 170 to the device 120 indicating that the device 120 has been added to the wireless network (A6).

Although the device 120 in FIG. 1 is depicted as a smart bulb, the device 120 is not limited to a smart bulb and may be any of various types of electronic devices, as described above. In addition, it should be understood that various types of power line networks, connections, or interfaces, such as a USB and USB port, could be used to transfer data and power.

Figure 2:
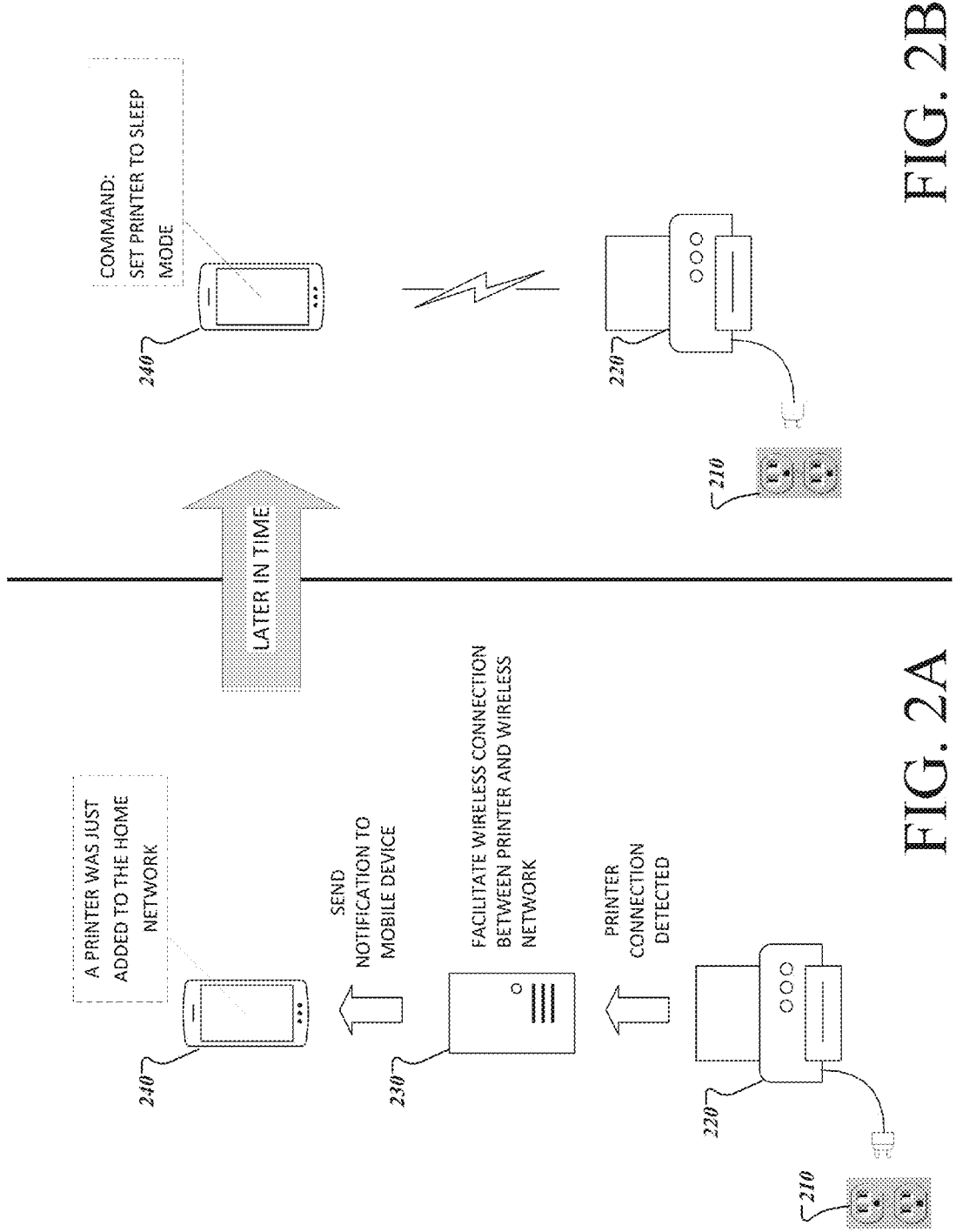
FIGS. 2A and 2B depict exemplary scenarios in which a user device communicates with another device over a wireless network.

FIG. 2A illustrates an example in which a device 220, such as a printer, is connected to a power line connector 210 and subsequently to a wireless network using the process illustrated by FIG. 1. After a secure wireless network connection is established, a power line network controller 240, which, in some implementations may include the network router, may send a message to a network privileged device 240, such as a mobile phone of a user or other trusted device, to let the user know that a new device was added to the wireless network. A user may refer to a person who is an administrator of the wireless network, who may be a person who lives in a home where the power line network is active. A user may also be a user of any of the devices connected to the wireless network or the power line network. A privileged device is described below.

In some implementations, a notification can be sent to a privileged device 240 when a device 220 attempts to access the power line network or the wireless network. In response to receiving the notification, the privileged device 240 may seek an input from the user to confirm that the device 220 can join and access the network, for example, on a user interface provided by the privileged device 240.

In some implementations, as illustrated in FIG. 2B, after the device 220 joins the wireless network, the user may be able to control the device 220 through the privileged device 240. For example, the user may enter a command in the privileged device 240 to set the device 220 to a sleep mode. The command is transmitted to the device 220 through the wireless network. The device 220 may then execute the command and modify its settings to a sleep mode.

Figure 3:
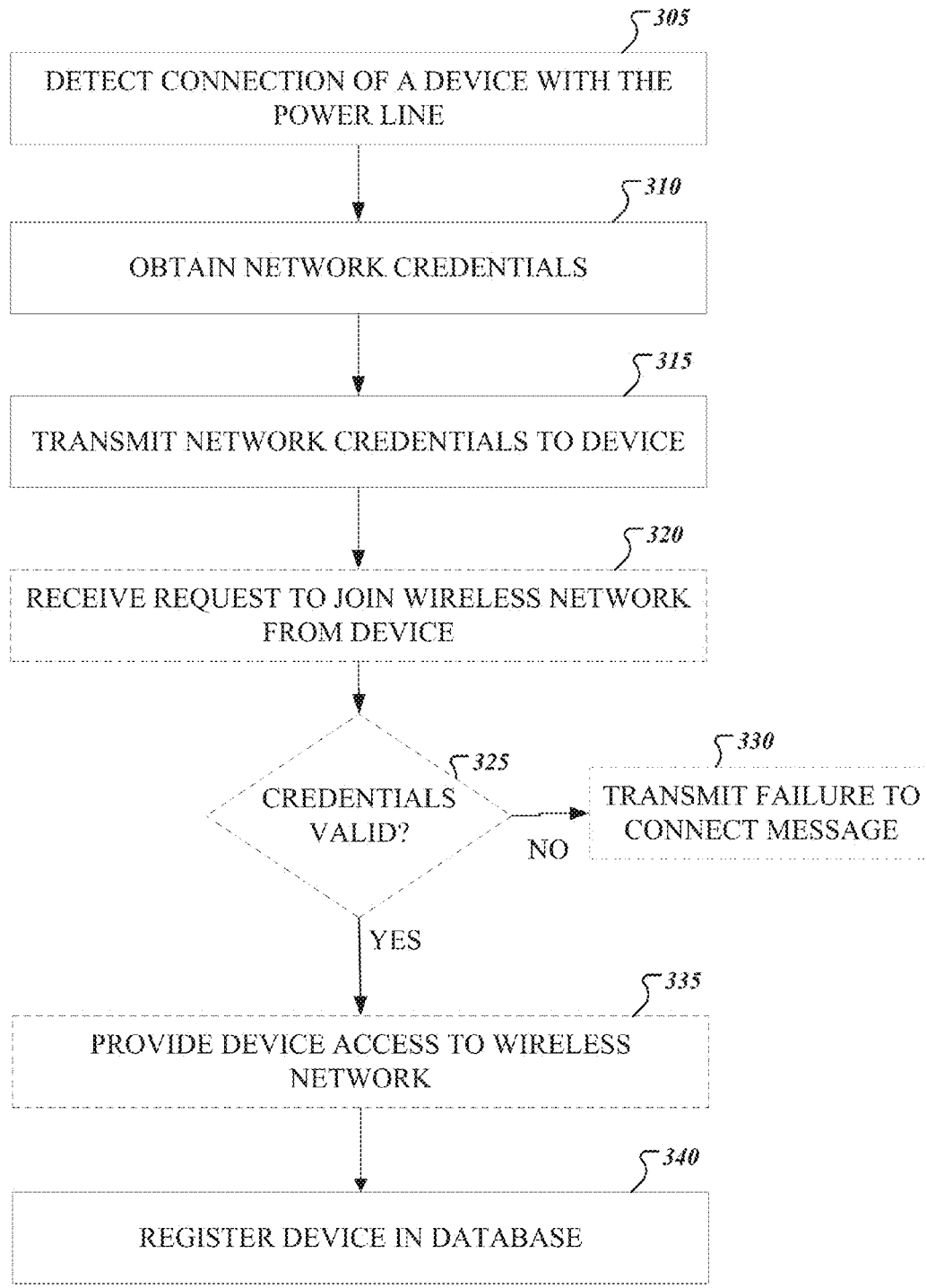
FIG. 3 depicts a flowchart illustrating a method for providing network connectivity to a device using a power line.
Figure 4:
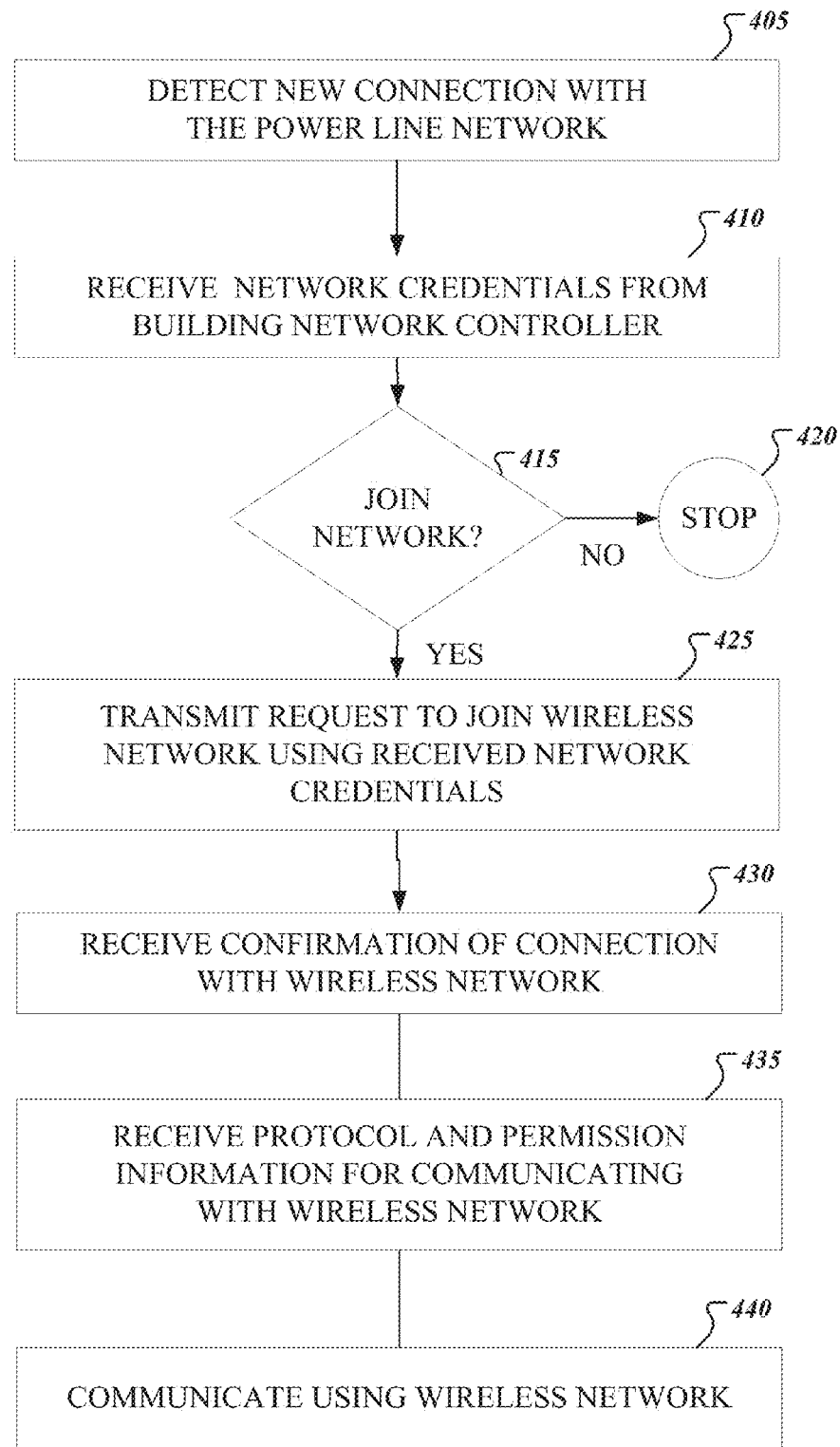
FIG. 4 depicts a flowchart illustrating a method implemented by a device to obtain wireless network connectivity using a power line.
Figure 5:
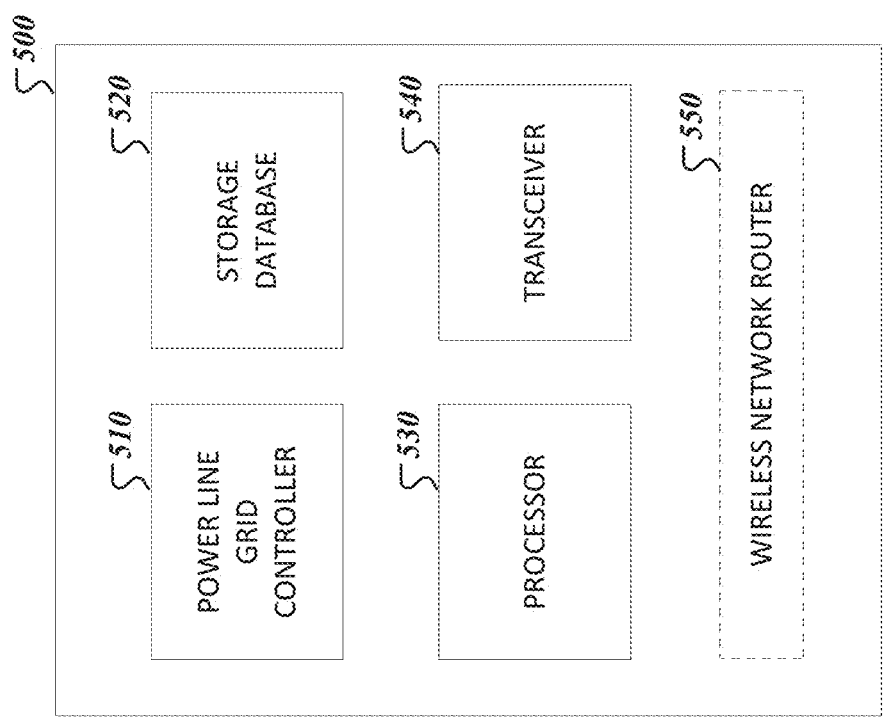
FIG. 5 depicts an exemplary implementation of a power line network controller.

Details of the implementations illustrated in FIGS. 1, 2A, and 2B are described further with reference to FIGS. 3, 4, and 5. FIG. 3 depicts a flowchart illustrating a method for providing network connectivity to a device using a power line. The dotted lines in FIG. 3 indicate steps that may be taken by a router, which may be implemented as part of or separate from the power line network controller 140.

A device 120 may be connected to a power line network 110 through a power line connector 130A in various manners. For example, power terminals of a device 120 may be connected to power terminals in a smart plug. In another example, a USB cable connected to the device 120 may be plugged into a USB port of the power line connector 130A. In another example, the device 120 may be switched from a power off operating state to a power on operating state. The connection between the device 120 and the power line connector 130A is a new connection such that, at the time immediately before connecting to the power line connector 130A, the device 120 was not powered on or connected to a power line connector 130A.

The power line network controller 140 may detect the new connection between the device 120 and the power line connector 130A (305). In some cases, the power line network controller 140 may detect a change in current or voltage at the power line connector 130A that corresponds to a device being newly connected to the power line connector 130A. In some cases, if the power line connector 130A is a smart power line connector, the power line connector 130A may detect that a new device has been connected to its port or terminal. The power line connector 130A may then send a signal to the power line network controller 140 indicating that a new device has connected to the power line connector 130A.

In some implementations, the device 120 may execute a communication protocol upon connecting to a power line network controller 140. As part of the communication protocol, the device 120 may transmit a message, such as a beacon message, over the power line network 110 to the power line network controller 140. The transmitted message includes information indicating that the device 120 is connected to a power line network 110.

After determining that a device 120 is connected to a power line connector 130A through any of the methods described above, the power line network controller 140 may obtain wireless network credentials 150 that can be used to establish a wireless connection between the device 120 and a wireless network in proximity of the building power line grid 100 (310). The power line network controller 140 may determine which wireless networks are available based on the location of the power line connector 130A.

In some implementations, the power line network controller 140 may identify a location of the device 120 based on the location of the power line connector 130A connected to the device 120. The power line network controller 140 may then determine the location of a wireless router that is connected to the power line network 110 and has the closest distance to the device 120. The power line network controller 140 may select a wireless network accessible by the wireless router located closest to the power line connector 130A.

In some implementations in which the power line connector 130A connected to the device 120 is a smart power line connector, the power line connector 130A may determine which wireless networks have the strongest signal at the power line connector 130A, and may transmit information identifying the wireless network having the strongest signal to the power line network controller 140. The power line network controller 140 may then select the identified wireless network with the strongest signal. A smart power line connector may be a power line connector that has a processor and a transceiver for sending and receiving data.

In some implementations, the power line network controller 140 may use a combination of information about the network signal strength and physical distance of the router from the power line connector 130A to select a wireless network to connect the device 120 to.

In some implementations, only one wireless network may be available in the proximity of the building power line grid 100, and the power line network controller 140 may not have to select one or several available wireless networks. In some implementations as shown in FIG. 1, the power line network controller 140 may include a router and may select a wireless network accessible by the router in the power line network controller 140.

After selecting a wireless network, the power line network controller 140 may communicate with a router that provides access to the selected wireless network to obtain wireless network credentials 150. For example, the power line network controller 140 may obtain a service set identifier (SSID) for the network and a password or key to access the network from the router. The key may be a randomly generated pre-shared key such as a wireless fidelity (Wi-Fi) protected access key 2 (WPA2). In some implementations, the key may have an expiration time, and may be updated periodically after a certain period of time, for example, 24 hours or 7 days. Other types of session keys may also be used. In some cases, the password may be a password set by a user or network administrator.

In some implementations, the wireless network credentials 150 may include a digital certificate. The digital certificate may include one or more keys, may have an expiration time, and may be updated periodically. In some implementations, the wireless network credentials 150 may include a token that may be renewed periodically.

After obtaining the wireless network credentials 150, the power line network controller 140 may transmit the wireless network credentials 150 to the device 120 through the power line network 110 and power line connector 130A (315). As noted above, the wireless network credentials 150 may include one or more of various types of credentials such as a SSID, a password, key, and a digital certificate. In some cases, the wireless network credentials 150 may also include an Internet Protocol (IP) address and Media Access Control (MAC) address of a network router and a Wi-Fi white list identifying IP and/or MAC addresses with certain privileges and restrictions. In some implementations, the power line network controller 140 may also transmit expiration data indicating a time period for which the wireless network credentials 150 are valid.

The device 120 may store the wireless network credentials 150 and the expiration data in a volatile memory, and may determine whether to join the wireless network based on one or more criteria. Operations executed by the device 120 to determine whether to join the wireless network are described with reference to FIG. 4 below.

If the device 120 determines that the one or more criteria for joining the wireless network are satisfied, the device 120 may generate a request 160 and transmit the request 160 to the router. The request 160 may be transmitted wirelessly or through the power line network 110. The request 160 may include the wireless network credentials 150 received through the power line network 110 and device information for the device 120. The device information may include one or more of a device type, a device name or identifier, an IP address, a MAC address, and an operating state of the device 120. Device type information may include information indicating a type or category of the device 120 such as information identifying the device 120 as a television device, a refrigerator device, a phone device, or a laptop device.

Operating state information may vary based on the type of device. In general, the operating state information may include information indicative of an operating mode or status, e.g., sleep mode, active mode, listening mode, silent mode, vibrating mode, of the device. The operating state information may also include information indicative of the power settings of the device 120.

In some cases, the device information may also include information indicative of features and characteristics of the device 120. For example, the device information may include data indicative of a make, model, manufacturer, year of manufacturing of the device 120. In some cases, the device information may include the most frequent operating mode of the device 120. In general, various types of information indicative of features and characteristics of the device 120 may be included in the device information.

A router may receive the request 160 to join the wireless network (320) and may determine whether the wireless network credentials 150 included in the request 160 are valid (325). The router for the wireless network may be integrated with, or in communication with the controller 140 or router that controls the power line network 110. To determine whether the credentials 150 are valid, the router may determine whether credential information such as certificate data or key information in the wireless network credentials 150 are valid at the time the request 160 is received.

For example, if the wireless network credentials 150 include a digital certificate, the router may determine whether the received digital certificate has been issued or signed by a trusted source and whether the digital certificate has not expired or is not revoked. If the router determines that the digital certificate is issued or signed by a trusted source and has not expired or been revoked, the digital certificate may be validated.

In another example, if the wireless network credentials 150 include a password or key, the router may determine whether the password or key match the password or key that are stored and not expired at the time the request 160 to join the wireless network is received.

If the wireless network credentials 150 are not valid, the router may transmit a failure to connect message to the device 120 indicating that the IoT could not be added to the wireless network (330). If the wireless network credentials 150 are valid, the router may provide network access to the device 120 and transmit a message 170 to the device 120 indicating that the device 120 has been added to the wireless network (335).

In some implementations, if the router and power line network controller 140 are implemented separately, the router may transmit a message to the power line network controller 140 indicating that the device 120 has been granted access to the wireless network. The power line network controller 140 may then register the device 120 in a database that stores information about devices connected to the power line network 110 (340). Registration of the device 120 may include storing some or all portions of the device information data included in the request 160 received from the device 120. The registration may also include storing data indicating a time when the device 120 was added to the wireless network and data identifying the wireless network that the device 120 is connected to.

After obtaining device information, the power line network controller 140 may determine communication permissions and protocols for communicating with the device 120. The power line network controller 140 may determine particular communication permissions and protocols that can be used to communicate with the device 120 based on the type of device and device capabilities. Examples of protocols include, for example, Weave, which allows privileged devices connected to the power line network 110 to send commands and instructions to the unprivileged devices to execute. Examples of permissions include, for example, permissions indicating which devices in the power line network 110 the device 120 can communicate with, permissions indicating whether the device 120 is designated as a privileged or unprivileged device, and permissions indicating certain restrictions or conditions under which the device 120 can communicate with other devices connected to the power line network 110.

A device may be designated as a privileged device upon satisfaction of a particular criterion, which may be modified or set by a user. For example, in some implementations, a user may configure the power line network 110 to have only one privileged device and may assign the user's mobile device or lap top as being the privileged device. In some implementations, the user may allow multiple devices to be privileged and may specify one or more attributes that a device should have to be designated as privileged. These attributes may include features such as, for example, having a particular hardware, such as a key board or touch screen, or a particular amount of processing power or storage space. In some cases, the attributes may include an identification of a particular type of device.

A privileged device may be granted permissions that provide an ability to control or manipulate other devices connected to the power line network 110 and/or the wireless network. For example, a privileged device may send commands to other devices to execute one or more operations. In some cases, a privileged device may be granted greater access to devices and network bandwidth relative to unprivileged devices. In some cases, a privileged device may revoke wireless network access of an unprivileged device.

If the features of a device do not satisfy the particular criterion for a privileged device, the device may be designated as an unprivileged device. An unprivileged device may be granted less network bandwidth, less access to devices, and fewer permissions relative to the network bandwidth, device access, and permissions granted to privileged devices. In some implementations, an unprivileged device may not be able to send commands to other devices connected to the power line network 110, but may receive commands to be executed from other privileged devices connected to the power line network 110.

In some implementations, the power line network controller 140 may include a mapping table used to determine communication permissions and protocols for the device 120. For example, based on device information that identifies a manufacturer of the device 120 and a year that the device 120 was manufactured, the mapping table may identify permissions and protocols mapped to the manufacturer and manufacturing year included in the device information. In some cases, a device profile for the device 120 may be generated based on the device information received from the device 120, and the mapping table may be used to identify permissions and protocols mapped to the device profile for the device 120. In some cases, the mapping table is not stored in the power line network controller 140 but is stored in a cloud-based database accessible by the power line network controller 140.

In some implementations, the power line network controller 140 may store information identifying the determined permissions and protocols as part of the registration of the device 120.

The power line network controller 140 may transmit information identifying the determined permissions and protocols to the device 120 and may implement the determined permissions and protocols for any communication with the device 120. In some implementations, software code or applications for implementing the permissions and protocols may be transmitted to the device 120. Upon receipt, the device 120 may install or execute the software code or applications to implement the permissions and protocols.

The device 120 may acknowledge the determined permissions and protocols by transmitting a message to the power line network controller 140 indicating an acceptance of the determined permissions and protocols. In some cases, the device 120 may reject the determined permissions and protocols by transmitting a message to the power line network controller 140 indicating a rejection of the determined permissions and protocols. If the device 120 rejects the determined permissions and protocols, the device 120 may operative as a passive device on the power line network 110 with limited or no capabilities to communicate with other devices on the power line network 110.

After the device 120 receives the determined permissions and protocols and obtains access to a wireless network, in some cases, information about the device 120 may be provided to a user. The information may include information indicative of features and characteristics of the device 120 such as, but not limited to, a device name or identifier, a device type, a device location, and an operating state of the device 120. The user may then provide instructions to execute one or more operations at the device 120.

For instance, a privileged device, such as a user mobile phone, may receive information that device 120 has been registered and is located in a particular room of the user's home. This information may be displayed as a notification on the user's privileged device. Subsequently, the user may use the privileged device to wirelessly send an instruction to the device 120 to set the device to a particular operating mode. As an example, a user may receive a notification that a smart light bulb has been connected to the power line grid in the basement of the user's home. The user may then use a smart phone to wirelessly send instructions to the smart light bulb to operate in the highest illumination setting of the light bulb shortly before the user goes to the basement.

In some implementations, when the device 120 is electrically powered off or disconnected from the power line network 110, the power line network controller 140 may revoke wireless network access of the device 120. When a device 120 is electrically powered off or disconnected from the power line network 110, the power line network controller 140 may detect a change in current or voltage at the power line connector 130A that corresponds to a device being powered off or disconnected to the power line connector 130A. In some cases, if the power line connector 130A is a smart power line connector, the power line connector 130A may detect that a device has been powered off or disconnected to its port or terminal. The power line connector 130A may then send a signal to the power line network controller 140 indicating that device 120 is no longer connected to the power line connector 130A.

After detecting that the device 120 is electrically powered off or disconnected from the power line network 110, the power line network controller 140 may communicate with the router to revoke network access for the device. For example, in some cases, network credentials, such as a password or key, used by the device 120 for accessing the wireless network may be changed. In some cases, a digital certificate designated to the device 120 may be revoked. If the password, key, or digital certificate are utilized to provide network access to multiple devices, when the password, key, or digital certificate are changed or revoked for one device, an updated password, key, or digital certificate may be sent to the remaining devices that are still connected to the wireless network. In some cases, revoking network access of the device 120 may include terminating the registration of the device 120 by deleting all device data stored during the registration.

FIG. 4 depicts a flowchart illustrating a method implemented by a device to obtain wireless network connectivity using a power line.

A device 120 may detect a new connection with a power line network 110 (405). As described above, the device 120 may be connected to a power line network 110 through a power line connector 130A in various manners. After being connected to the power line network 110, the device 120 may receive wireless network credentials 150 to access a wireless network (410). As noted above, the wireless network credentials 150 may include one or more of a digital certificate, a token, one or more session keys, a SSID, and a password.

In response to receiving the wireless network credentials 150, the device 120 may determine whether one or more criteria for joining the wireless network are satisfied (415). In some implementations, the device 120 may be configured to access a wireless network at certain predetermined times. For example, a device 120 may be configured to receive data such as software updates on a periodic basis after expiration of a predetermined time period. The device 120 may then only connect with the wireless network after expiration of the time period to receive the software update. After receiving the software update and before expiration of the time period, the device 120 may decide not to connect with the wireless network.

In another example, a device 120 may be connected to another wireless network and may connect to the wireless network selected by the power line network controller 140 only if the signal strength associated with the selected wireless network is stronger than the signal strength of the wireless network the device 120 is connected to.

In some implementations, the device 120 may display a notification via a display on the device 120 requesting the user to indicate whether the user would like the device 120 to join the wireless network. If the user responds with an input indicating that the user would like the device 120 to join the wireless network, the device 120 may proceed with operations to join the wireless network. If the user responds with an input indicating that the user would not like the device 120 to connect to the wireless network, the device 120 does not execute any operations to join the wireless network.

If the criteria for joining the wireless network are not satisfied, the device 120 may maintain the wireless network credentials 150 and continue to receive and store updates on the wireless network credentials 150 using the power line without connecting to the wireless network selected by the power line network controller 140 (420).

If the device 120 determines that the one or more criteria for joining the wireless network are satisfied, the device 120 may generate and transmit a request 160 to join the wireless network to the router (425). As described above with reference to FIG. 3, the request 160 may be transmitted wirelessly or through the power line network 110, and may include device information for the device 120 and the wireless network credentials 150 received through the power line network 110.

The router receiving the request 160 may determine whether the wireless network credentials 150 included in the request 160 are valid as discussed above, e.g., operation 325. If the wireless network credentials 150 are determined to be valid, the device 120 receives a message 170 from the router confirming that device 120 has been added to the wireless network (430) and may receive protocol and permission information for communicating with the wireless network from the power line network controller 140 (435). The protocol and permission information received from the power line network controller 140 has been described above.

If the protocols and permissions identified by the received protocol and permission information are acceptable, the device 120 communicates with other devices in the wireless network in accordance with the identified protocols and permissions (440). If the device 120 rejects the determined permissions and protocols, the device 120 may operate as a passive device on the power line network 110 with limited or no capabilities to communicate with other devices on the power line network 110.

In some implementations, when the device 120 is disconnected from the power line network 110 or the device 120 is powered off, wireless network access of the device 120 may be terminated by the router. In addition, the wireless network credential information may be removed from the volatile memory. If the device 120 is reconnected to the power line network 110 or powered on, the device 120 would have to repeat the operations depicted in FIG. 4 to reconnect with a wireless network.

FIG. 5 depicts an exemplary implementation of a power line network controller 500, which may include a power line grid controller 510, a storage database 520, a processor 530, and a transceiver 540. A wireless network router 550 may, in some cases, be implemented in the power line network controller 500.

A power line network controller 500 may be implemented in a wireless network router, a circuit breaker, a power panel, or one or more servers. In some implementations, a power line network controller 500 may be implemented in a device plugged into a power outlet which handles bootstrapping and authentication for devices connected to the power line network.

Referring to FIG. 5, the power line grid controller 510 may execute one or more power line networking protocols such as, for example, X10, HomePlug AV, Powerline AV, to support communications with devices connected to the power line network. The power line grid controller 510 may execute one or more operations illustrated in FIG. 3. For example, the power line grid controller 510 may detect new devices that connect to the power line network; may control registration of the new devices; may issue wireless network credentials; may manage network communications, may issue protocols and permissions for the new devices to use in network communications; and may control removal of registered device data when a device disconnects from the power line network. The power line grid controller 510 may also implement security protocols for detecting tampering or intrusions in the power line network.

The power line grid controller 510 and the processor 530 may be implemented separately or integrated as one entity. The processor 530 may include one or more processors coupled to all components of the power line network controller 500, and may control the operations of the power line network controller 500. The processor 530 may include various logic circuitry and programs to execute the various implementations described herein. Processor 530 may include general and special purpose microprocessors.

Storage database 520 may include one or more mass storage devices, for example, magnetic, magneto optical disks, optical disks, EPROM, EEPROM, flash memory devices, and may be implemented as internal hard disks, removable disks, magneto optical disks, CD ROM, or DVD-ROM disks for storing data. The storage database 520 may store registration data, protocol data, permission data, device information, and a mapping table that maps protocol and permissions to particular types of devices.

The storage database 520 may include a cloud database or a database managed by a database management system (DBMS). A DBMS may be implemented as an engine that controls organization, storage, management, and retrieval of data in a database. DBMSs frequently provide the ability to query, backup and replicate data, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Transceiver 550 includes a transmitter and a receiver and may be utilized to communicate with devices connected to the power line network, devices connected to a wireless network, external networks, and the power line network controller 500. The transceiver 550 may include amplifiers, modulators, demodulators, antennas, and various other components. The transceiver 550 may direct data received from devices connected to the power line network to other components of the power line network controller 500 such as the processor 530 or power line grid controller 510. The transceiver 550 may also direct data received from components of the power line network controller 500 to devices connected to the power line network.

In some implementations, the transceiver 540 may be part of a router 550. The router 550 may control network access, network security, firewall functionalities, data transport, and other services for any device connected to one or more wireless networks. In some implementations, the wireless networks may include a Wireless Fidelity (Wi-Fi) network. In some implementations, the wireless networks may include a local area network (LAN) or other short-range wireless networks such as Bluetooth, Infrared, Zigbee networks, or an enterprise Internet Protocol (IP) network.

The router 550 may also control data transmission between a local network, such as a Wi-Fi network, and external networks. The external networks may include various networks such as the Internet, Worldwide Interoperability for Microwave Access (WiMAX) networks, or wide area networks (WANs). The external networks may include a cloud network that provides Internet services and other network-related functions, e.g., storing data.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, for example, one or more modules of computer program instructions encoded on a computer readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to suitable receiver apparatus.

A computer program, also known as a program, software, software application, script, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be deployed to be executed on one computer or on multiple computers that are located at one site or distributed across multiple sites and interconnected by a communication network.

While this specification contains many specifics, these should not be construed as limitations on the scope of the disclosure or of what may be claimed, but rather as descriptions of features specific to particular implementations. Certain features may be implemented as separate embodiments or in combination in a single embodiment. Although features may be described above as acting in certain combinations and may even be claimed as such, one or more features from a claimed combination may in some cases be excised from the combination, and the claimed combination may be directed to a sub-combination or variation of a sub-combination.

Similarly, while actions are described in a particular order in this specification, the description should not be understood as requiring that such actions be performed in the particular order shown or in sequential order, or that all illustrated actions be performed, to achieve desirable results. Moreover, the separation of various system components in the implementations described above should not be understood as requiring such separation in all implementations.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A system comprising:
one or more computing devices and one or more storage devices storing instructions that, when executed by the one or more computing devices, cause the one or more computing devices to perform operations comprising:
  determining, by the one or more computing devices, that an electronic device has been connected to a power line based on a change in electrical characteristics of a circuit of the power line;
  in response to determining that the electronic device has been connected to the power line, transmitting, by the one or more computing devices, one or more wireless network credentials to the electronic device through the power line, wherein the wireless network credentials enable the electronic device to access to a wireless network;
  before the electronic device is connected to the wireless network, receiving, by the one or more computing devices, a request from the electronic device to connect to the wireless network, the request comprising the one or more wireless network credentials that are transmitted by the one or more computing devices to the electronic device through the power line;
  in response to receiving the one or more credentials in the request from the electronic device, determining that the electronic device is authorized to access the wireless network; and
  in response to determining that the one or more wireless network credentials received in the request from the electronic device are valid, providing the electronic device an authorized wireless connection to the wireless network.

2. The system of claim 1, wherein the operations comprise:
  transmitting, to the electronic device over the power line, data indicative of an expiration time period for the one or more credentials;
  in response to the one or more credentials expiring and the expiration time period having transpired, generating a second credential; and
  transmitting, to the electronic device, the second credential and data indicative of an expiration time period for the second credential.

3. The system of claim 1, wherein the operations comprise:
  determining that the electronic device has been disconnected from the power line; and
  terminating the authorized wireless connection between the electronic device and the wireless network in response to determining that the electronic device has been disconnected from the power line.

4. The system of claim 1, wherein the operations comprise:
  identifying a location of the electronic device based on a location of the connection between the electronic device and the power line; and
  determining a location of a router that provides access to the wireless network based on the identified location of the electronic device.

5. The system of claim 1, wherein:
the one or more credentials comprise a Wi-Fi protected access two (WPA2) session key; and
determining, based on the one or more credentials received in the request from the electronic device, that the electronic device is authorized to access the wireless network comprises:
  determining that the WPA2 session key received from the electronic device matches a session key at the one or more computing devices.

6. The system of claim 1, wherein the operations further comprise:
  in response to providing the electronic device access to the wireless network, registering the electronic device by storing, in a database, device information indicative of one or more of a device type, a device name, and an operating state of the electronic device.

7. The system of claim 6, wherein the operations further comprise:
  determining that the electronic device is disconnected from the power line; and
  in response to determining that the electronic device is disconnected from the power line:
    terminating registration of the electronic device by removing the stored device information from the database, the stored device information including a time when the electronic device was added to the wireless network, data identifying the wireless network, and one or more permissions granted to the electronic device; and revoking the one or more credentials that enable the electronic device to access to the wireless network.

8. The system of claim 1, wherein the operations further comprise:
receiving device information indicating characteristics of the electronic device;
determining, by one or more computing devices, a profile of the electronic device based on the received characteristics of the electronic device;
obtaining protocol data associated with the profile of the electronic device, the protocol data comprising permissions and configurations for a connection of the electronic device to the wireless network; and
transmitting the protocol data to the electronic device.

9. The system of claim 1, wherein the operations further comprise:
allocating a first authority level to the electronic device, the first authority level granting the electronic device a permission to execute one or more operations at a second device connected to the power line; or
allocating a second authority level to the electronic device, the second authority level preventing the electronic device from executing one or more operations at a second device connected to the power line, and granting the second device permission to execute one or more operations at the electronic device,
wherein the allocation of the first authority level or the second authority level to the electronic device is based on one or more of network settings configured by a user and one or more characteristics of the electronic device.

10. The system of claim 1, further comprising:
in response to receiving the one or more credentials in the request from the electronic device, determining a wireless communication priority level to designate to the electronic device, the wireless communication priority level being an indication of a priority of the electronic device among a plurality of devices on the wireless network,
wherein providing the electronic device access to the authorized wireless connection to the wireless network comprises providing the electronic device the authorized wireless connection to the wireless network according to the wireless communication priority level.

11. The system of claim 1, wherein determining that the electronic device has been connected to the power line based on a change in electrical characteristics of the circuit of the power line comprises determining that a current level or voltage level at a power line connection point has changed.

12. An electronic device comprising:
one or more processors and one or more storage devices storing instructions which when executed by the one or more processors, cause the one or more processors to perform operations comprising:
establishing, by the electronic device, a power line communication connection over a power line in response to being connected to the power line;
receiving, from one or more computing devices, one or more wireless network credentials for accessing a wireless network, the one or more wireless network credentials being received through the power line;
before connecting to the wireless network, transmitting, to the one or more computing devices, a request to connect to the wireless network, the request comprising the one or more wireless network credentials that are received from the one or more computing devices through the power line; and
receiving, from the one or more computing devices, data indicating that the electronic device has an authorized wireless connection to the wireless network.

13. The electronic device of claim 12, wherein the operations further comprise:
receiving, from the one or more computing devices, data indicative of an expiration time period for the one or more credentials; and
storing, by the electronic device in a storage database, the one or more credentials and the data indicative of the expiration time period for the one or more credentials.

14. The electronic device of claim 13, wherein the operations further comprise:
determining that the electronic device has been disconnected from the power line;
receiving, from the one or more computing devices, an indication that the one or more wireless network credentials for accessing the wireless network have been revoked; and
removing, from the storage database, the one or more wireless network credentials and the data indicative of the expiration time period for the one or more credentials.

15. The electronic device of claim 12, wherein:
the one or more credentials comprise a Wi-Fi protected access two (WPA2) session key.

16. The electronic device of claim 12, wherein the operations further comprise:
transmitting, to the one or more computing devices, device information that comprises data indicative of one or more of a device type, a device name, and an operating state of the electronic device; and
receiving, from the one or more computing devices, one or more wireless network permissions assigned to the electronic device based on the device information.

17. The electronic device of claim 16, wherein the one or more network permissions assigned to the electronic device comprise:
a first authority level granting the electronic device a permission to execute one or more operations at a second device connected to the power line; or
a second authority level preventing the electronic device from executing one or more operations at a second device connected to the power line.

18. A computer-implemented method comprising:
determining, by one or more computing devices, that an electronic device has been connected to a power line based on a change in electrical characteristics of a circuit of the power line;
in response to determining that the electronic device has been connected to the power line, transmitting, by the one or more computing devices, one or more wireless network credentials to the electronic device through the power line, wherein the wireless network credentials enable the electronic device to access to a wireless network;
before the electronic device is connected to the wireless network, receiving, by the one or more computing devices, a request from the electronic device to connect to the wireless network, the request comprising the one or more wireless network credentials transmitted by the one or more computing devices to the electronic device through the power line;

in response to receiving the one or more credentials in the request from the electronic device, determining that the electronic device is authorized to access the wireless network; and in response to determining that the one or more wireless network credentials that are received in the request from the electronic device are valid, providing the electronic device an authorized wireless connection to the wireless network.

19. The computer-implemented method of claim 18, further comprising:

determining that the electronic device has been disconnected from the power line; and terminating the authorized wireless connection between the electronic device and the wireless network in response to determining that the electronic device has been disconnected from the power line.

20. The computer-implemented method of claim 18, further comprising:

receiving device information indicating characteristics of the electronic device;

determining, by one or more computing devices, a profile of the electronic device based on the received characteristics of the electronic device;

obtaining protocol data associated with the profile of the electronic device, the protocol data comprising permissions and configurations for a connection of the electronic device to the wireless network; and transmitting the protocol data to the electronic device.

21. The computer-implemented method of claim 20, further comprising:

allocating a first authority level to the electronic device, the first authority level granting the electronic device a permission to execute one or more operations at a second device connected to the power line; or allocating a second authority level to the electronic device, the second authority level preventing the electronic device from executing one or more operations at a second device connected to the power line, and granting the second device permission to execute one or more operations at the electronic device, wherein the allocation of the first authority level or the second authority level to the electronic device is based on one or more of network settings configured by a user and the profile of the electronic device.

22. One or more non-transitory computer-readable storage media comprising instructions, which, when executed by one or more computers, cause the one or more computers to perform actions comprising:

determining, by the one or more computing devices, that an electronic device has been connected to a power line based on a change in electrical characteristics of a circuit of the power line;

in response to determining that the electronic device has been connected to the power line, transmitting, by the one or more computing devices, one or more wireless network credentials to the electronic device through the power line, wherein the wireless network credentials enable the electronic device to access to a wireless network;

before the electronic device is connected to the wireless network, receiving, by the one or more computing devices, a request from the electronic device to connect to the wireless network, the request comprising the one or more wireless network credentials that are transmitted by the one or more computing devices to the electronic device through the power line;

in response to receiving the one or more credentials in the request from the electronic device, determining that the electronic device is authorized to access the wireless network; and in response to determining that the one or more wireless network credentials received in the request from the electronic device are valid, providing the electronic device an authorized wireless connection to the wireless network.

23. One or more non-transitory computer-readable storage media comprising instructions, which, when executed by one or more processors, cause the one or more processors to perform actions comprising:

establishing a power line communication connection over a power line in response to being connected to the power line;

receiving, from one or more computing devices, one or more wireless network credentials for accessing a wireless network, the one or more wireless network credentials being received through the power line;

before connecting to the wireless network, transmitting, to the one or more computing devices, a request to connect to the wireless network, the request comprising the one or more wireless network credentials that are received from the one or more computing devices through the power line; and receiving, from the one or more computing devices, data indicating that the electronic device has an authorized wireless connection to the wireless network.

24. A computer-implemented method comprising:

establishing, by an electronic device, a power line communication connection over a power line in response to being connected to the power line;

receiving, from one or more computing devices, one or more wireless network credentials for accessing a wireless network, the one or more wireless network credentials being received through the power line;

before connecting to the wireless network, transmitting, to the one or more computing devices, a request to connect to the wireless network, the request comprising the one or more wireless network credentials that are received from the one or more computing devices through the power line; and receiving, from the one or more computing devices, data indicating that the electronic device has an authorized wireless connection to the wireless network.

\* \* \* \* \*